United States Patent
Drabeck et al.

(10) Patent No.: US 6,549,529 B1
(45) Date of Patent: Apr. 15, 2003

(54) SYSTEM AND METHOD FOR CONTROLLING ANTENNA DOWNTILT/UPTILT IN A WIRELESS COMMUNICATION NETWORK

(75) Inventors: Lawrence Drabeck, Long Branch, NJ (US); Karl Hampel, New York, NY (US); Paul Mankiewich, Glen Gardner, NJ (US); Paul Polakos, Marlboro, NJ (US); Ajay Rajkumar, New Providence, NJ (US); Anthony Triolo, Succasunna, NJ (US); Norman Ziesse, Chester, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/240,577

(22) Filed: Feb. 1, 1999

(51) Int. Cl.⁷ ............................................. H04B 7/212
(52) U.S. Cl. ...................................... 370/347; 455/442
(58) Field of Search ................... 370/347, 252, 370/338, 401, 328, 489; 455/442, 422, 436, 522, 562, 561, 226.2, 524, 575, 63, 447, 446, 423; 342/367, 372; 343/853; 714/26

(56) References Cited

U.S. PATENT DOCUMENTS

| | | | |
|---|---|---|---|
| 4,249,181 A | | 2/1981 | Lee |
| 4,994,813 A | | 2/1991 | Shiramatsu et al. |
| 5,551,060 A | * | 8/1996 | Fujii et al. ................ 455/447 |
| 5,745,858 A | | 4/1998 | Sato et al. |
| 5,761,619 A | * | 6/1998 | Danne et al. ............. 342/372 |
| 5,809,395 A | * | 9/1998 | Hamilton-Piercy et al. . 370/489 |
| 5,818,385 A | * | 10/1998 | Bartholomew ........... 342/372 |
| 5,953,661 A | * | 9/1999 | Schwinghammer et al. 455/423 |
| 6,005,884 A | * | 12/1999 | Cook et al. .............. 370/401 |
| 6,047,186 A | * | 4/2000 | Yu et al. .................. 455/446 |
| 6,085,335 A | * | 7/2000 | Djoko et al. .............. 714/20 |
| 6,097,970 A | * | 8/2000 | Angus et al. ............. 455/562 |
| 6,104,936 A | * | 8/2000 | Kronestedt .............. 455/562 |
| 6,118,767 A | * | 9/2000 | Shen et al. ............... 370/252 |
| 6,141,565 A | * | 10/2000 | Feuerstein et al. ........ 455/560 |
| 6,198,458 B1 | * | 3/2001 | Heinz et al. ............. 343/853 |
| 6,311,075 B1 | * | 10/2001 | Bevan et al. ............. 455/562 |

OTHER PUBLICATIONS

Edward Benner et al., "Effects of Antenna Height, Antenna Gain, and Pattern Downtilting for Cellular Mobile Radio", May 1996, IEEE Transactions on Vehicular Technology, vol. 45, No. 2, pp. 217–224.*

Wu Jianhui et al., "Antenna Downtilt Performance in Urban Environments", Aug. 1996, Military Communication Conference (MILCOM '96), vol. 3, pp. 739–744.*

Canadian Intellectual Property Office Patent Search, Oct. 17, 2001.

Canadian Intellectual Property Office Patent Search, Oct. 17, 2001.

Wu, Jung–Shyr, et al. "Hot–Spot Traffic Relief with a Tilted Antenna in CDMA Cellular Networks." IEEE Transactions on Vehicular Technology, vol. 47, Feb. 1998; pp. 1–9.

Jabbari, Bijan. "Cellular Mobile Radio, Wireless PCS, Cellular Data Networks", Telecommunications Handbook, pp. 26.71–26.85.

Jung–Shyr Wu et al., "Performance Study of Traffic Balancing via Antenna–Tilting in CDMA Cellular Systems," IEEE Vehicular Technology Conference, 1996.

* cited by examiner

Primary Examiner—Kwang Bin Yao
Assistant Examiner—Prenell Jones
(74) Attorney, Agent, or Firm—Harness, Dickey & Pierce, P.L.C.

(57) ABSTRACT

The wireless communication system includes antennas having electrically controllable downtilt angles and downtilt controllers associated with each antenna. The downtilt controllers receive instructions from a main controller, and adjust the downtilt angles of the associated antennas in accordance with the received instructions.

39 Claims, 4 Drawing Sheets

SYSTEM AND METHOD FOR CONTROLLING ANTENNA DOWNTILT/UPTILT IN A WIRELESS COMMUNICATION NETWORK

BACKGROUND OF THE INVENTION

1. Field of the Invention

The present invention relates to a wireless communication system and method for controlling antenna downtilt/uptilt.

2. Description of Related Art

Conventional wireless communication systems include a plurality of cell sites, each having a base station sending and receiving signals over one or more associated antennas or antenna modules. The antenna module usually includes at least one receive and one transmit antenna, but could use a single antenna for both the transmit and receive functions. The radiation pattern (particularly, the main lobe) of, for example, a transmitting antenna at a cell site may be tilted from a horizontal reference of the antenna by a certain angle. This angle is referred to as the downtilt angle of the antenna, and is measured to be positive from the horizontal reference of the antenna towards the ground. Accordingly, an antenna with a downtilt angle of 10 degrees tilts towards the ground more than an antenna with a downtilt angle of 5 degrees.

Each antenna has a coverage area, which is a geographic area in which a mobile terminal will communicate with a base station associated with the antenna. The extent of an antenna's coverage area is affected by its downtilt angle and the downtilt angles of surrounding, but not necessarily adjacent, antennas.

Conventionally, the downtilt angles of the antennas in wireless communication systems are set at the time of system installation according to predetermined downtilt angles. Installation workers climb up each antenna tower or support (e.g., a building), supporting antennas in the system, and manually fix the downtilt angle of each antenna according to the predetermined values. If the downtilt angle needs to be changed after the network installation, the worker has to once again climb up the antenna tower to manually adjust the downtilt angle of the antenna. While it may be practical to make adjustments of the wireless communication system in this manner to small portions of the system, making adjustments is cumbersome, time consuming, costly and potentially dangerous since it requires a worker to go up the antenna tower and adjust the downtilt angle of the antenna. The difficulty, cost and complexity, however, increases as the number of antennas requiring downtilt angle changes increases. Also, it is impractical to make downtilt angle adjustments based on short term events, such as changes in the time of day (e.g., mobile terminal traffic in a coverage area for a business complex will be greater during business hours), and most long term events (e.g., a change in seasons wherein foliage affects signal-to-noise ratio).

Because the downtilt angles of antennas in a wireless communication system directly effect the quality of system performance, a demand exists for a simple, easy and cost effective manner in which to change the downtilt angles of the antennas in a wireless communication system to improve system performance. Typically, operators monitor the quality of their system by taking operational measurements indicative thereof. These operational measurements include, but are not limited to, co-channel interference (i.e., interference between two signals using the same channel frequency), signal-to-noise plus interference ratios within coverage areas, bit error rates within coverage areas, call blocking rates (e.g., the ratio of (1) the number of mobile terminals in a coverage area having their call requests denied by the base station because of insufficient resources at the base station which are dedicated to (2) the antenna module for that coverage area to the number of mobile terminals requesting calls in the coverage area) within coverage areas, etc. For example, signal strength interference measurements between two coverage areas can indicate an amount by which signals transmitted by adjacent antennas overlap; and therefore, provide an indicator as to the quality of hand-offs between coverage areas for these adjacent antennas. As another example, high call block rates can indicate unacceptable levels at which customers (i.e., mobile terminal users) are denied service and/or an overload condition. Typically, when the call blocking rate or other measure of load on a base station is greater than a predetermined threshold, the base station serving that coverage area or the coverage area itself is said to be overloaded.

Some of the operational measurements are made by one or more test receivers at known measurement locations within the wireless communication system, and making the operational measurements using the test receiver. Other operational measurements, such as call blocking rates, are made as part of system operation. The changes in operational measurements over time may reflect changes within the coverage area such as a population increase, addition of a new structure (e.g., a building), etc that affect the quality of system performance. Based on the operational measurements, changes may be made to the wireless communication system to improve the quality of system performance.

For instance, when a problem, such as poor coverage (e.g., low signal-to-noise ratio for signals received in a coverage area), is indicated by the operational measurements, the signal strength of signals transmitted by the antenna for the problem coverage area may be changed and the signal strength of signal transmitted by one or more antennas for coverage areas adjacent thereto may be changed until the operational measurements show acceptable coverage.

A demand, however, exists for greater freedom in addressing quality of system performance concerns. Namely, a demand exists for improved, alternative or additional methods of addressing quality of system performance concerns. A simple, easy, and cost effective manner of adjusting the downtilt angles of antennas in a wireless communication system would facilitate meeting such demands.

SUMMARY OF THE INVENTION

The present invention provides a wireless communication system including antennas having electrically controllable downtilt angles and downtilt controllers associated with each antenna. The downtilt controllers receive instructions from a main controller, and adjust the downtilt angles of the associated antennas in accordance with the received instructions. From the main controller, an operator can effect changes that vary from system wide changes in the downtilt angles of the antennas in the system to changes in the downtilt angle of a single antenna. From the base station associated with an antenna, an operator on the ground can effect changes in the downtilt angle of the associated antenna. Making changes in the downtilt angle, whether from the base station or the main controller, using the present invention avoids the costly and dangerous process of climbing a tower or other support structure to manually adjust the antenna's downtilt angle.

Because the process of changing downtilt angles is so simple with the present invention, the present invention allows adaptive control of the downtilt angles to address issues of quality in the system, such as hand-off quality (e.g., signal overlap), denial of service (e.g., load), co-channel interference, signal-to-noise plus interference ratios, bit error rate, etc, even during system performance. Furthermore, the system according to the present invention allows automating the process or portions of the process for addressing these quality issues.

BRIEF DESCRIPTION OF THE DRAWINGS

The present invention will become more fully understood from the detailed description given hereinbelow and the accompanying drawings which are given by way of illustration only, wherein like reference numerals designate like parts in the various drawings, and wherein.

DETAILED DESCRIPTION OF THE PREFERRED EMBODIMENTS

Initially the structure of the wireless communication system according to the present invention will be described with respect to FIGS. 1–4. Afterwards, the operation of the wireless communication system according to the present invention will be described in detail with reference to FIGS. 1–4. An exemplary application of the wireless communication system according to the present invention will then follow.

Wireless Communication System

Figure 1:
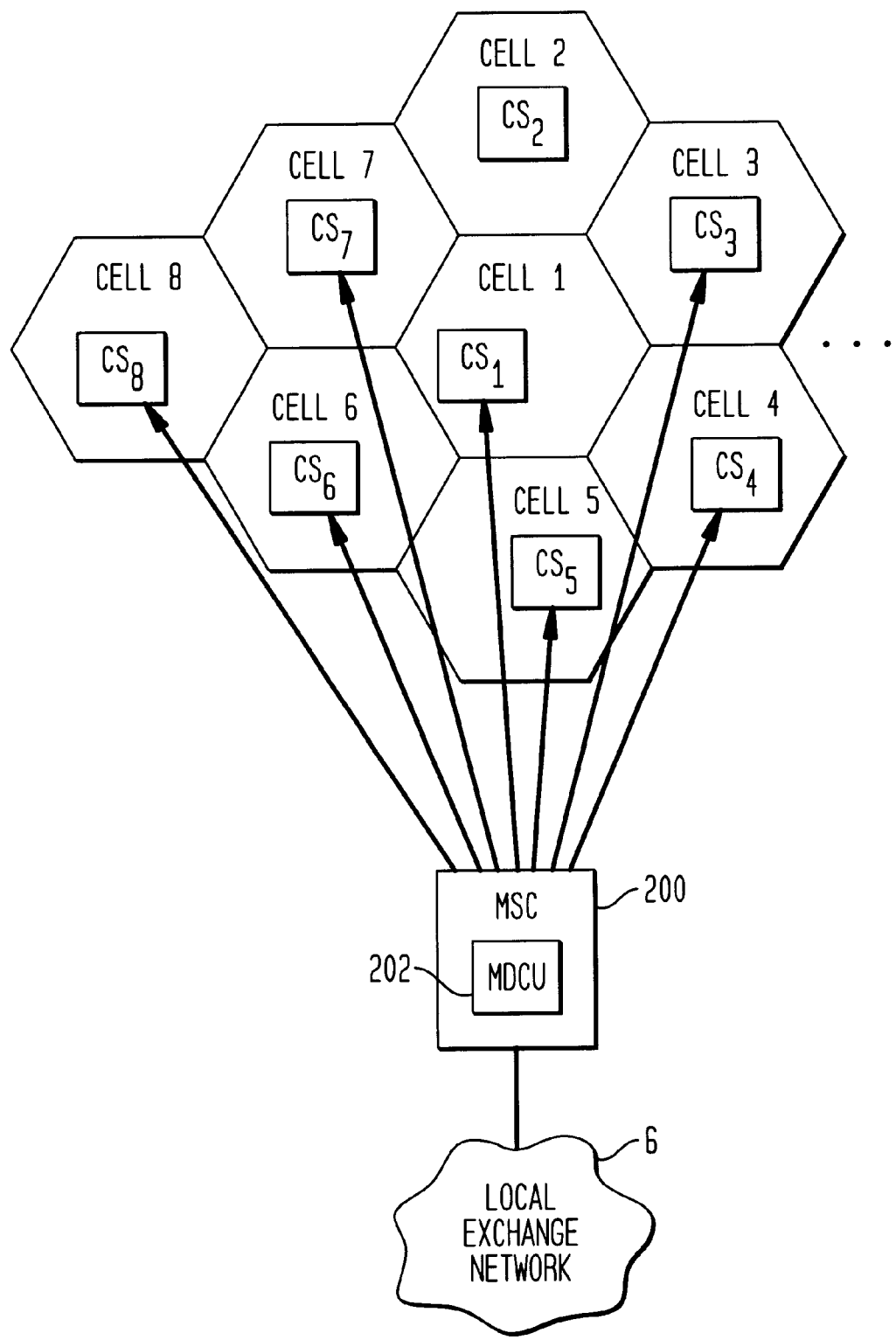
FIG. 1 shows a wireless communication system according to the present invention.

FIG. 1 illustrates a wireless communication system according to the present invention. As shown, a plurality of cells Cell 1, Cell 2, . . . each include a cell site CS1, CS2, . . . , respectively. A mobile switching center (MSC) 200 communicates with each cell site CS1, CS2, . . . and a local exchange network 6. The local exchange network 6 represents networks over which voice and/or data are communicated such as the Public Switched Telephone Network, the Integrated Service Digital Network, the internet, other internet protocol network, etc. The MSC 200 is any well-known MSC except for the addition of a main downtilt control unit (MDCU) 202. However, the MDCU 202 does not need to form part of the MSC 200, and instead, can be formed separately and even be located remotely from the MSC 200. The MDCU 202 is a data processing system programmed to operate as described in detail below, and, which when formed as part of the MSC 200, utilizes the memory and user interfaces supplied by the MSC 200. When provided separately from the MSC 200, the MDCU 202 includes a user interface, memory, and an interface for interfacing with the MSC 200.

Figure 2:
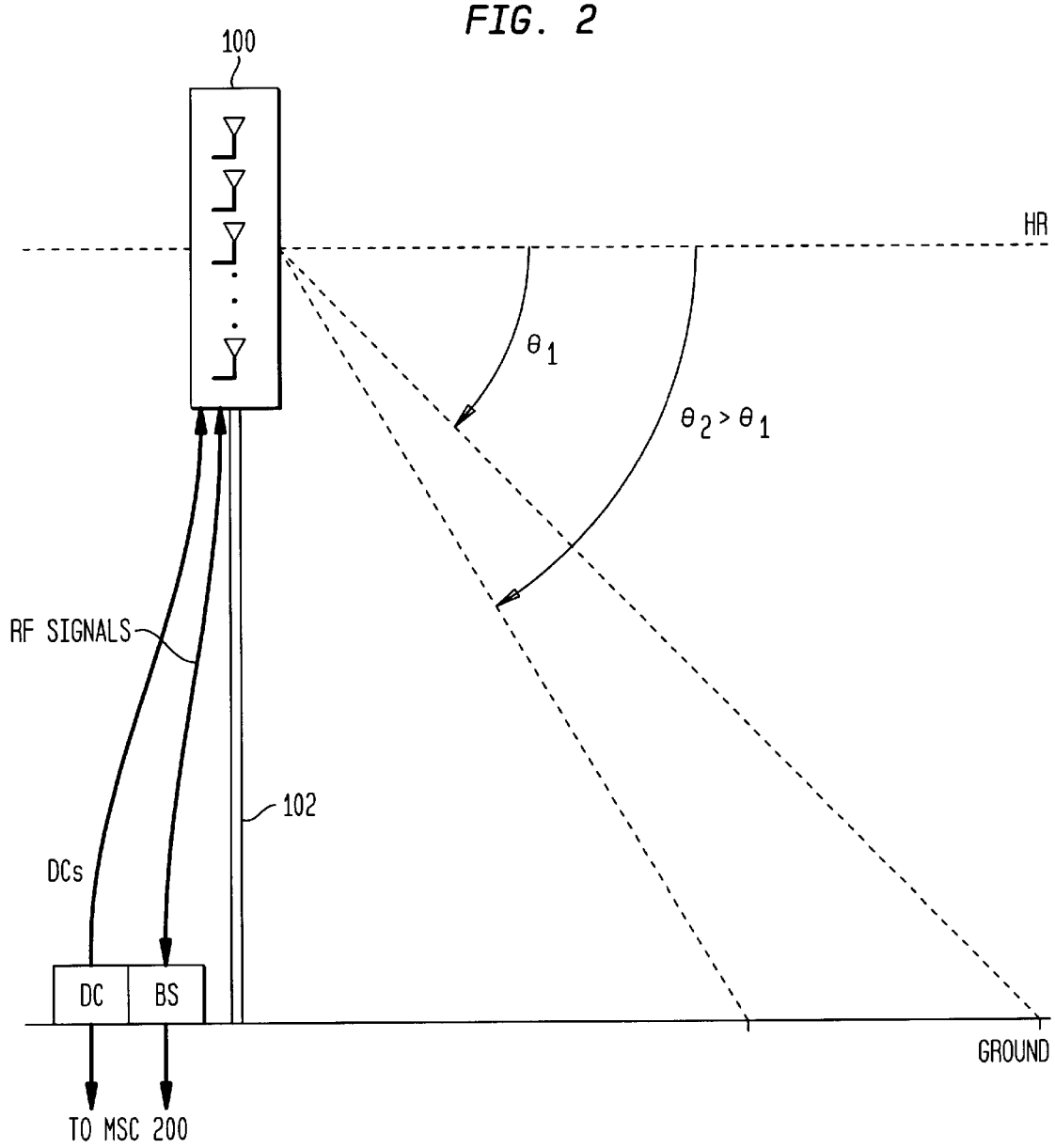
FIG. 2 shows a diagram of a cell site in the system of FIG. 1.

FIG. 2 shows an exemplary block diagram of each cell site CS1, CS2, . . . in the wireless communication system according to the present invention. As shown therein, each cell site CS1, CS2, . . . includes at least one electrically controllable antenna module 100, a support unit 102, a base station BS, and at least one downtilt controller DC. The controllable antenna module 100 is mounted on the support unit 102. The base station BS communicates radio frequency (RF) signals to and from the antenna module 100, and communicates with the MSC 200. The downtilt controller DC communicates with the base station and the MSC 200 (more particularly, the MDCU 202), and controls the downtilt angle of the antenna module 100. The antenna module 100 includes one or more electrically controllable transmitting and/or receiving antennas. Such controllable antennas can be any type, such as an electrically controlled phased array antennas, motorized mechanically controlled phased array antennas, motorized mechanically downtiltable antennas, etc. These antennas can be configured as omnidirectional antennas (azimuth angle of 360 degrees), three-sector antennas (azimuth angle of 120 degrees), six-sector antennas (azimuth angle of 60 degrees), or any other multi-sector antenna.

If a multi-sector antenna system is used in each cell site CS1, CS2, . . . , each cell site CS1, CS2, . . . has an antenna module 100 and an associated downtilt controller DC corresponding to each sector. For example, each three-sector antenna system of a cell employs three antenna modules, each with its own coverage area, and three downtilt controllers DCs. A single base station BS still communicates RF signals to and from the antenna modules 100, but the resources of the base station BS are divided among the three antenna modules 100.

The support unit 102 can be an antenna tower or any other support unit known in the art for supporting the antenna module 100 above the ground. The base station BS is known in the art for transmitting, receiving, and monitoring wireless communications, e.g., mobile phone calls, paging messages, etc., through the antenna module 100.

Figure 3:
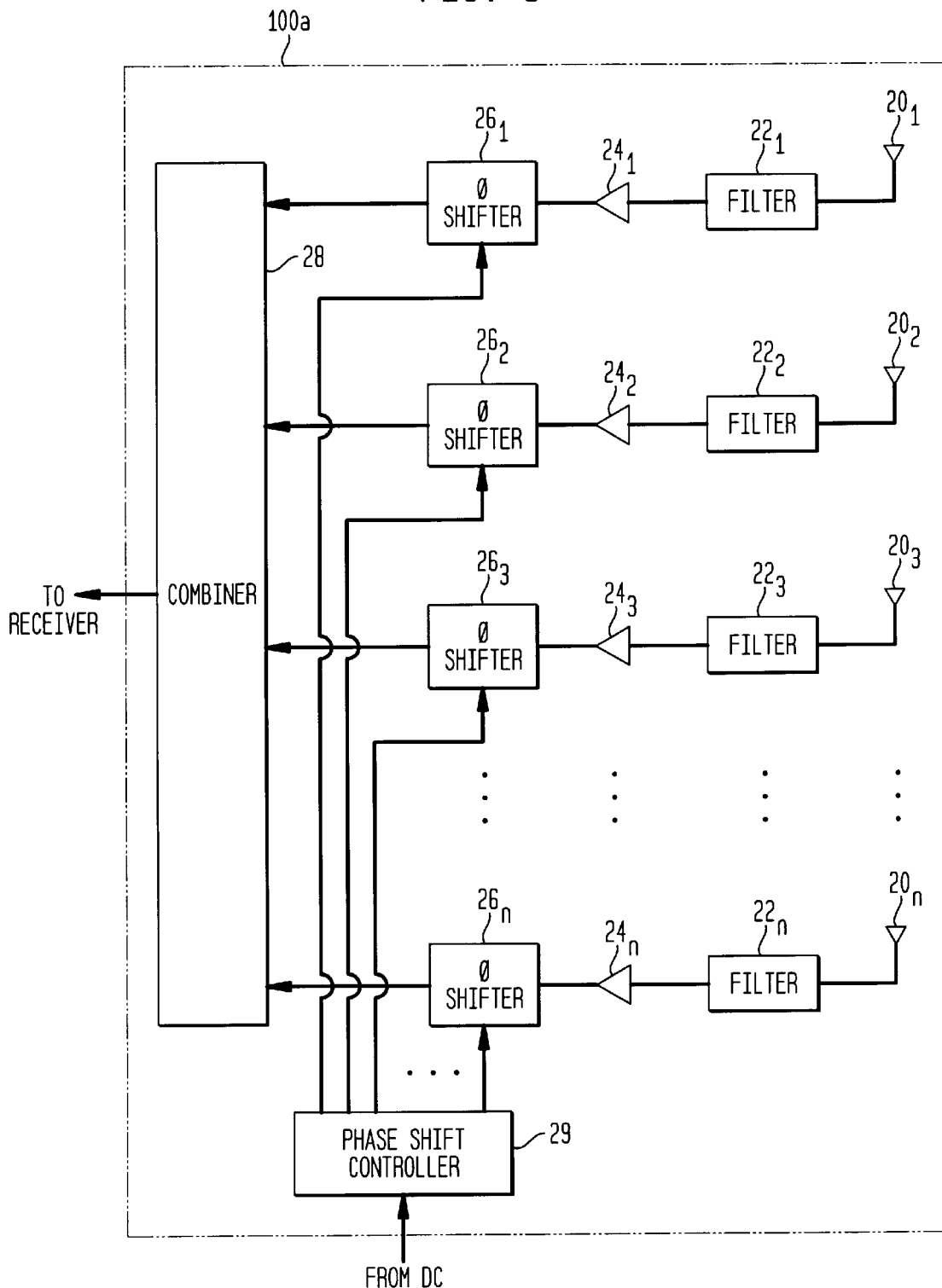
FIG. 3 shows a block diagram of a receiving antenna module used in the system in FIG. 1.

FIG. 3 shows a block diagram of a controllable receiving antenna module 100a, which may be used as the antenna module 100 in FIG. 2, according to the present invention. The antenna module 100a is a voltage controllable phased array antenna.

As shown in FIG. 3, the receiving antenna module 100a includes a plurality of antenna elements $20_1$–$20_n$, a plurality of filters $22_1$–$22_n$ connected to the antenna elements $20_1$–$20_n$, a plurality of preamplifiers $24_1$–$24_n$ connected to the filters $22_1$–$22_n$, a plurality of phase shifters $26_1$–$26_n$ connected to the preamplifiers $24_1$–$24_n$, a combiner 28 connected to the phase shifters $26_1$–$26_n$, and a phase shift controller 29 connected to the phase shifters $26_1$–$26_n$.

The antenna elements $20_1$–$20_n$ receive RF signals from external sources, e.g., a mobile terminal. The filters $22_1$–$22_n$ filter the RF signals received by the antenna elements $20_1$–$20_n$ and the preamplifiers $24_1$–$24_n$ amplify the filtered RF signals. The phases of the RF signals output from the preamplifiers $24_1$–$24_n$ are shifted by the phase shifters $26_1$–$26_n$. The combiner 28 combines the outputs of the phase shifters $26_1$–$26_n$ and outputs the combined signal to a receiver, e.g., the base station BS. The phase shift controller 29 receives a control signal from the downtilt controller DC indicating the desired downtilt angle or desired change in the downtilt angle, and outputs corresponding control signals to control the phases of the phase shifters $26_1$–$26_n$. Namely, in this phased array antenna module 100a, the downtilt angle of the antenna module 100a is changed by varying the phases of the phase shifters $26_1$–$26_n$ to achieve the desired downtilt angle or desired change in the downtilt angle.

Figure 4:
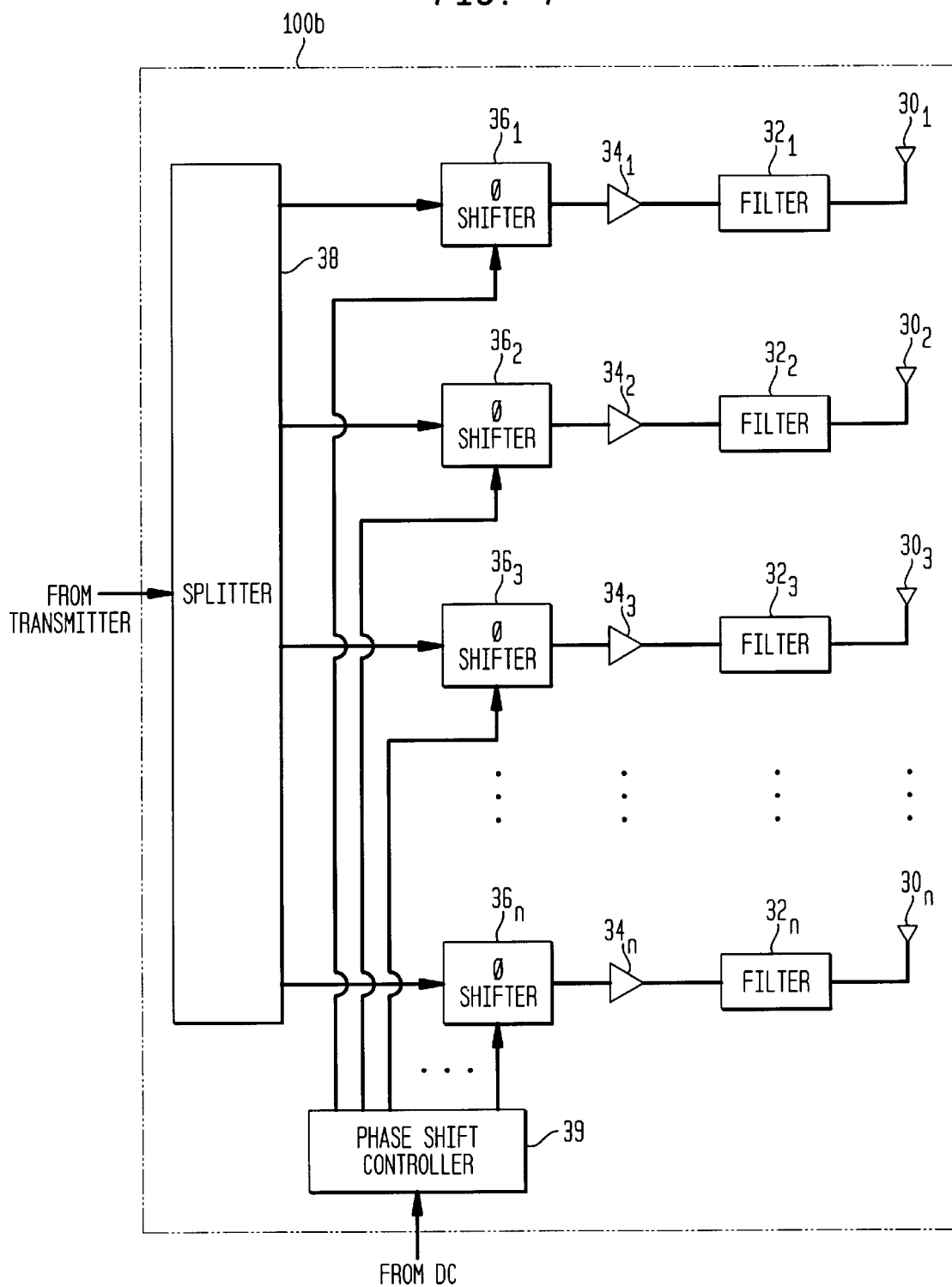
FIG. 4 shows a block diagram of a transmitting antenna module used in the system in FIG. 1.

FIG. 4 shows an exemplary block diagram of a controllable transmitting antenna module 100b, which may be used as the antenna module 100 in FIG. 2, according to the present invention. The antenna module 100b is a voltage controllable phased array antenna.

As shown FIG. 4, the transmitting antenna module 100b includes a plurality of antenna elements $30_1$–$30_n$, a plurality of filters $32_1$–$32_n$ connected to the antenna elements $30_1$–$30_n$, a plurality of power amplifiers $34_1$–$34_n$ connected to the filters $32_1$–$32_n$, a plurality of phase shifters $36_1$–$36_n$ connected to the power amplifiers $34_1$–$34_n$, a splitter 38 connected to the phase shifters $36_1$–$36_n$, and a phase shift controller 39 connected to the phase shifters $36_1$–$36_n$. Signals from a transmitter (e.g., the base station BS) are split into a plurality of transmitting signals by the splitter 38. The phase of each transmitting signal is shifted by a corresponding phase shifter $36_1$–$36_n$, and amplified by a corresponding power amplifier $34_1$–$34_n$. The filters $32_1$–$32_n$ filter the outputs of the power amplifiers $34_1$–$34_n$ and the signals output from the filters $32_1$–$32_n$ are transmitted by the antenna elements $30_1$–$30_n$. The phase shift controller 39 receives a control signal from the downtilt controller DC indicating the desired downtilt angle or desired change in the downtilt angle, and controls the phases of the phase shifters $36_1$–$36_n$ based on thereon.

Various modifications to both the receiving and transmitting antenna modules 100a and 100b are possible. For instance, with respect to the transmitting antenna module 100b, the plurality of power amplifiers $36_1$–$36_n$ could be replaced by a single power amplifier disposed before the splitter 38.

The transmitting and receiving antenna modules 100a and 100b in FIGS. 3 and 4 can be substituted or used in conjunction with any other type of antenna module to form the antenna module 100 in FIG. 2 according to the present invention. Furthermore, the transmitting and receiving antenna modules 100a and 100b may be integrated into one antenna module as known in the art, such that the antenna module 100 can be a transmitting antenna module, a receiving antenna module, or a transmitting and receiving antenna module.

Operation of the Wireless Communication System

The operation of the wireless communication system according to the present invention will now be described. When an operator at the MSC 200 enters a desired downtilt angle or desired change in the downtilt for an antenna module 100, the MDCU 202 outputs a control signal to the downtilt controller DC for the antenna module 100. The control signal supplies the downtilt controller DC with the desired downtilt angle or desired change in the downtilt angle. In response to the received control signal, the downtilt controller DC generates and outputs a control signal to the antenna module 100 so that the desired downtilt angle or desired change in downtilt angle is achieved by the antenna module 100. In this manner, an operator located at MSC 200 can remotely control the downtilt angle of an antenna module 100.

However, the operation of the wireless communication system is not limited to downtilt control originating from the MSC 200, controlling the downtilt of a single antenna module 100, or operator intervention in the downtilt control operation.

Instead of controlling the downtilt from the MSC 200, an operator at a base station BS enters a desired downtilt angle or change in downtilt angle for an antenna module 100 associated with the base station BS. This information is supplied by the base station BS to the downtilt controller DC for the antenna module 100, and in response to this information, the downtilt controller DC generates and outputs a control signal to the antenna module 100 so that the desired downtilt angle or desired change in downtilt angle is achieved by the antenna module 100. Accordingly, downtilt control from both the MSC 200 and the base station BS eliminates the need to perform the costly and dangerous process of climbing the tower supporting the antenna module 100 in order to adjust the downtilt of the antenna module 100.

Instead of controlling the downtilt angle of a single antenna, an operator at the MSC 200 enters the desired downtilt angles or desired changes in downtilt angles for as many antenna modules 100 as desired. The MDCU 202 then outputs control signals to the downtilt controllers DCs for the antenna modules 100. Each control signal received by a downtilt controller DC indicates the desired downtilt angle or change in downtilt angle for the antenna module 100 associated therewith. Accordingly, the downtilt controllers DCs perform downtilt control of the antenna modules 100 in the same manner as discussed above. As a result, an operator at the MSC 200 can effect substantially simultaneous changes in the downtilt angles of multiple antenna modules 100. Therefore, making system wide changes to the downtilt angles of the antennas modules 100 in the wireless communication system according to the present invention is simple and easy.

The wireless communication system according to the present invention can be used to simply and easily set the downtilt angles of the antenna modules 100 during installation. However, the system according to the present invention also simplifies making changes to the downtilt angles of the antenna modules 100 as part of a system quality improvement effort to improve the call hand-off process, denial of service, etc. As was described in the Background of the Invention section, operational measurements, such as co-channel interference, signal-to-noise plus interference ratios within a coverage area, bit error rates within a coverage area and signal strength measurements between two coverage areas, indicative of system quality are typically made using a test receiver, and improvements in these operational measurements are obtained through trial and error. According to the present invention, the downtilt angle of one or more antenna modules 100 may be changed and operational measurements taken after each change until the operational measurements indicate acceptable levels of quality.

Furthermore, the present invention allows these processes to become automated; thus eliminating operator involvement. Namely, in one embodiment, the MDCU 202 is programmed to make timed changes in the downtilt angles to compensate for time dependent changes in load (e.g., change of seasons or commuting times). As a result, overload or unacceptable levels of service denial can be avoided. In another embodiment, the MDCU 202 receives operational measurements from the MSC 200, and is programmed to determine the downtilt angles of antenna modules 100 according any known or future developed method for determining downtilt angles based on operational measurements such as call blocking rates. Using the determined downtilt angles, the MDCU 202 then outputs control signals to the appropriate downtilt controllers DCs. Accordingly, the wireless communication system according to this embodiment permits adaptive downtilt control based on even short term events. Next, an application of this embodiment of the wireless communication system will be described in detail.

Application of Wireless Communication System To Avoid Overload in An Automated Manner As discussed previously, each antenna module 100 has a coverage area dependent upon its downtilt angle. The larger the coverage area, the more mobile terminals that may be located within the coverage area requiring the limited resources of the base station BS dedicated to the coverage area of the antenna module 100. When the resources of the base station BS are exceeded by the demand for those resources, the base station BS and/or the coverage area is said to be overloaded. Numerous criteria exist for measuring the load on a base station BS or coverage area to judge whether the base station BS and/or coverage area is overloaded. For the purposes of discussion, the remaining description will use the call blocking rate as the criterion for measuring load, but the present invention in not limited to use of this criterion. The call blocking rate may also be defined in several ways, but again, for the purpose of discussion, the call blocking rate as used in this description is the ratio of (1) the number of mobile terminals in a coverage area having their call requests denied by the base station because of insufficient resources at the base station which are dedicated to the antenna module for that coverage area to (2) the number of mobile terminals requesting calls in the coverage area.

When the call blocking rate exceeds a first predetermined threshold value, the base station BS is considered to be overloaded. The call blocking rate as the measure of load has been chosen because existing conventional MSCs measure the call blocking rates for each coverage area of the base stations associated therewith, and supply the MSC with the measured call blocking rates. Accordingly, how the call blocking rates are determined will not be described.

The present invention provides a simple and easy way to handle both long term and short term events, such as load increases during peak commuting times. For example, when a base station is in the overloaded state, the MDCU 202 determines which coverage areas adjacent to the coverage area of the overloaded base station are available to handle the overload. For example, if the call blocking rate of a base station serving an adjacent coverage area is less than a second predetermined threshold, which is lower than the first predetermined threshold, the base station and adjacent coverage area are available.

The system according to the present invention then permits the MDCU 202 to easily reduce the coverage area served by the overloaded base station by increasing the downtilt angle of the antenna module for that coverage area and/or increase one or more available coverage areas served by the available base stations by decreasing the downtilt angles of the antenna modules for the available coverage areas. This shifts the boundary between the coverage area of the overloaded base station and the coverage areas adjacent thereto to transfer load from the overloaded base station.

While the adaptive and automated control application of the present invention has been described with respect to eliminating overload and thus reducing denial of service, the present invention also applies to improving other aspect of a wireless communication system such as the quality of hand-offs.

The wireless communication system according to the present invention is applicable to any system such as a time-division multiple access system, a code division multiple access system, an analog system, etc.

What is claimed is:

1. A wireless communication system, comprising:
   a plurality of cell sites, each cell site including an antenna having an electrically controllable downtilt angle and an associated downtilt controller controlling a downtilt angle of said associated antenna; and
   a main controller outputting a control signal to said downtilt controllers of at least two cell sites to adjust said downtilt angle of said associated antennas of said at least two cell sites and the relationship therebetween,
   wherein said main controller generates and outputs said main control signals based on at least one operational measurement of said wireless communication system.

2. The system of claim 1, wherein said operational measurement is at least one of load, signal strength of signals received from two of said antennas, interference between signals received from said first and second antennas, a signal-to-noise ratio of signals received from one of said antennas, and a bit error rate of signals received from one of said antennas.

3. The system of claim 1, wherein said main controller outputs control signals to said at least two downtilt controllers to simultaneously adjust said downtilt angles of said associated antennas.

4. The system of claim 1, wherein said control signal indicates at least one of desired downtilt angles for said associated antennas and desired changes in said downtilt angles for said associated antennas.

5. A wireless communication system, comprising:
   a primary cell site including a primary antenna having an electrically controllable downtilt angle and a primary downtilt controller controlling said downtilt angle of said primary antenna, said primary antenna having a primary coverage area based on said downtilt angle thereof;
   at least one secondary cell site including a secondary antenna having an electrically controllable downtilt angle and a secondary downtilt controller controlling said downtilt angle of said secondary antenna, said secondary antenna having a secondary coverage area based on said downtilt angle thereof, said secondary coverage area being adjacent to said primary coverage area; and
   a main controller determining whether said primary coverage area is overloaded, and outputting control signals to said primary and secondary downtilt controllers to adjust a boundary between said primary and secondary coverage areas by respectively changing said downtilt angles of said primary and secondary antennas when said primary coverage area is overloaded.

6. The system of claim 5, wherein said main controller determines said primary coverage area is overloaded by monitoring a primary load on said primary coverage area, and determining when said primary load exceeds a first predetermined threshold.

7. The system of claim 5, wherein said main controller monitors secondary load on said secondary coverage area, and outputs said control signals based on said secondary load on said secondary coverage area when said primary coverage area is overloaded.

8. The system of claim 7, wherein said main controller determines whether said secondary coverage area is available to handle additional load based on said secondary load, and outputs said control signals to adjust said boundary between said secondary coverage area and said primary coverage area when said primary coverage area is overloaded and said secondary coverage area is available.

9. The system of claim 8, wherein said main controller determines said secondary coverage area is available when said secondary load is less than a second predetermined threshold.

10. The system of claim 5, wherein said main controller outputs control signals to said primary downtilt controller to increase said downtilt angle of said primary antenna when said primary coverage area is overloaded.

11. The system of claim 10, wherein said main controller outputs control signals to said secondary downtilt controller to decrease said downtilt angle of said second antenna when said primary coverage area is overloaded.

12. A method of controlling antenna tilt in a controller of a wireless communication system, comprising:
providing a plurality of cell sites, each cell site including an antenna, each antenna having an electrically controllable downtilt angle and an associated downtilt controller controlling a downtilt angle of said associated antenna;
outputting a control signal to said downtilt controllers of at least two cell sites to adjust said downtilt angle of said associated antennas of said at least two cell sites such that the relationship between associated antennas is adjusted,
wherein said outputting step outputs said main control signals based on at least one operational measurement of said wireless communication system.

13. The method of claim 12, wherein said operational measurement is at least one of load, signal strength of signals received from two of said antennas, interference between signals received from said first and second antennas, a signal-to-noise ratio of signals received from one of said antennas, and a bit error rate of signals received from one of said antennas.

14. A method of controlling antenna tilt in a wireless communication system, comprising:
providing a primary cell site including a primary antenna having an electrically controllable downtilt angle and a primary downtilt controller controlling said downtilt angle of said primary antenna, said primary antenna having a primary coverage area based on said downtilt angle thereof;
providing at least one secondary cell site including a secondary antenna having an electrically controllable downtilt angle and a secondary downtilt controller controlling said downtilt angle of said secondary antenna, said secondary antenna having a secondary coverage area based on said downtilt angle thereof, said secondary coverage area being adjacent to said primary coverage area;
first determining whether said primary coverage area is overloaded; and
outputting control signals to said primary and secondary downtilt controllers to adjust a boundary between said primary and secondary coverage areas by respectively changing said downtilt angle of said primary and secondary antennas when said primary coverage area is overloaded.

15. The method of claim 14, wherein said first determining step determines said primary coverage area is overloaded by monitoring a primary load on said primary coverage area, and determining when said primary load exceeds a first predetermined threshold.

16. The method of claim 14, further comprising:
monitoring secondary load on said secondary coverage area; and
wherein said outputting step outputs said control signals based on said secondary load on said secondary coverage area when said primary coverage area is overloaded.

17. The method of claim 16, further comprising:
second determining whether said secondary coverage area is available to handle additional load based on said secondary load; and wherein said outputting step outputs said control signals to adjust said boundary between said secondary coverage area and said primary coverage area when said primary coverage area is overloaded and said secondary coverage area is available.

18. The method of claim 17, wherein said second determining step determines said secondary coverage area is available when said secondary load is less than a second predetermined threshold.

19. The method of claim 14, wherein said outputting step outputs control signals to said primary downtilt controller to increase said downtilt angle of said primary antenna when said primary coverage area is overloaded.

20. The method of claim 14, wherein said outputting step outputs control signals to said secondary downtilt controller to decrease said downtilt angle of said second antenna when said primary coverage area is overloaded.

21. A wireless communication system, comprising:
a first antenna at a first cell site having an electrically controllable downtilt angle;
a first downtilt controller outputting a control signal to said first antenna to control said downtilt angle of said first antenna;
a second antenna at a second cell site having an electrically controllable downtilt angle;
a second downtilt controller outputting a control signal to said second antenna to control said downtilt angle of said second antenna;
a main controller outputting a main control signal to said first downtilt controller and said second downtilt controller to adjust a relationship between said first and second antennas,
wherein said main controller generates and outputs said main control signal based on at least one operational measurement of said wireless communication system.

22. The system of claim 21, wherein said operational measurement is at least one of load, signal strength of signals received from at least one of said first and second antennas, interference between signals received from at least one of said first and second antennas, a signal-to-noise ratio of signals received said first antenna, and a bit error rate of signals received from said first antenna.

23. The system of claim 21, wherein the wireless communication system is one of a time-division multiple access system, a code-division multiple access system and an analog system.

24. The system of claim 21, wherein said main controller generates and outputs said main control signal based on user input.

25. The system of claim 21, wherein said relationship is co-channel interference between signals received from said first and second antennas.

26. The system of claim 21, wherein said relationship is a boundary between coverage areas of said first and second antennas.

27. The system of claim 21, wherein said relationship is an amount by which signals received from said first antenna overlap signals received from said second antenna.

28. The system of claim 21, wherein said relationship is respective loads on said first and second antennas.

29. A wireless communication system, comprising:
a primary cell site including a primary antenna having an electrically controllable downtilt angle and a primary downtilt controller controlling said downtilt angle of said primary antenna, said primary antenna having a primary coverage area based on said downtilt angle thereof;

at least one secondary cell site including a secondary antenna having an electrically controllable downtilt angle and a secondary downtilt controller controlling said downtilt angle of said secondary antenna, said secondary antenna having a secondary coverage area based on said downtilt angle thereof, said secondary coverage area being adjacent to said primary coverage area; and a main controller determining whether said primary coverage area is overloaded, and outputting control signals to said primary and secondary downtilt controllers to adjust a boundary between said primary and secondary coverage areas by respectively changing said downtilt angles of said primary and secondary antennas when said primary coverage area is overloaded, wherein said main controller outputs control signals to said primary downtilt controller to simultaneously adjust said downtilt angle of said primary antenna and said down tilt angle of said secondary antenna.

30. A method of controlling antenna tilt in a controller of a wireless communication system, comprising:

first outputting a first control signal to a first antenna at a first cell site having an electrically controllable downtilt angle to control said downtilt angle of said first antenna;

second outputting a second control signal to a second antenna at a second cell site having an electrically controllable downtilt angle to control said downtilt angle of said second antenna; and controlling said first and second outputting steps based on a determined adjustment of the relationship between said first antenna and said second antenna, wherein said controlling step determines said adjustment based on at least one operational measurement of said wireless communication system.

31. A method of controlling antenna tilt in a wireless communication system, comprising:

first outputting a first control signal to a first antenna having an electrically controllable downtilt angle to control said downtilt angle of said first antenna;

second outputting a second control signal to a second antenna having an electrically controllable downtilt angle to control said downtilt angle of said second antenna; and controlling said first and second outputting steps such that the relationship between said first antenna and said second antenna is adjusted, wherein said first control signal indicates one of a desired downtilt angle for said first antenna and a desired change in said downtilt angle of said first antenna, and said second control signal indicates one of a desired downtilt angle for said second antenna and a desired change in said downtilt angle of said antenna.

32. The method of claim 30, wherein said operational measurement is at least one of load, signal strength of signals received from at least one of said first and second antennas, interference between signals received from at least one of said first and second antennas, a signal-to-noise ratio of signals received said first antenna, and a bit error rate of signals received from said first antenna.

33. The method of claim 30, wherein said relationship is one of co-channel interference between signals received from said first and second antennas, a boundary between coverage areas of said first and second antennas, an amount by which signals received from said first antenna overlap signals received from said second antenna, and respective loads on said first and second antennas.

34. A method of controlling antenna tilt in a wireless communication system, comprising:

providing a primary cell site including a primary antenna having an electrically controllable downtilt angle and a primary downtilt controller controlling said downtilt angle of said primary antenna, said primary antenna having a primary coverage area based on said downtilt angle thereof;

providing at least one secondary cell site including a secondary antenna having an electrically controllable downtilt angle and a secondary downtilt controller controlling said downtilt angle of said secondary antenna, said secondary antenna having a secondary coverage area based on said downtilt angle thereof, said secondary coverage area being adjacent to said primary coverage area;

first determining whether said primary coverage area is overloaded; and outputting control signals to said primary and secondary downtilt controllers to adjust a boundary between said primary and secondary coverage areas by respectively changing said downtilt angle of said primary and secondary antennas when said primary coverage area is overloaded, wherein said outputting step outputs control signals to said primary downtilt controller and secondary downtilt controller to simultaneously adjust the downtilt angle of said primary antenna and said secondary antenna.

35. The method of claim 12, wherein said outputting step outputs said control signal to said at least two downtilt controllers to simultaneously adjust said downtilt angles of said associated antennas.

36. The method of claim 12, wherein said control signal indicates at least one of desired downtilt angles for said associated antennas and desired changes in said downtilt angles for said associated antennas.

37. The system of claim 21, wherein said main controller outputs control signals to said first downtilt controller and said second downtilt controller to simultaneously adjust the downtilt angles of said first antenna and said second antenna.

38. The system of claim 21, wherein said main control signal indicates one of a desired downtilt angle for said first antenna and a desired change in said downtilt angle of said first antenna, and said main control signal further indicates one of a desired downtilt angle for said second antenna and a desired change in said downtilt angle of said antenna.

39. The method of claim 30, wherein said first and second control signals simultaneously adjust the downtilt angles of said first antenna and said second antenna.

* * * * *